(12) United States Patent
Hao

(10) Patent No.: US 10,564,481 B2
(45) Date of Patent: Feb. 18, 2020

(54) METHOD FOR ALIGNING LIQUID CRYSTALS AND LIQUID CRYSTAL ALIGNMENT SYSTEM

(71) Applicant: Shenzhen China Star Optoelectronics Semiconductor Display Technology Co., Ltd., Shenzhen, Guangdong (CN)

(72) Inventor: Sikun Hao, Shenzhen (CN)

(73) Assignee: Shenzhen China Star Optoelectronics Semiconductor Display Technology Co., Ltd., Shenzhen, Guangdong (CN)

(*) Notice: Subject to any disclaimer, the term of this patent is extended or adjusted under 35 U.S.C. 154(b) by 189 days.

(21) Appl. No.: 15/574,896

(22) PCT Filed: Nov. 10, 2017

(86) PCT No.: PCT/CN2017/110318
§ 371 (c)(1),
(2) Date: Nov. 17, 2017

(87) PCT Pub. No.: WO2019/056528
PCT Pub. Date: Mar. 28, 2019

(65) Prior Publication Data
US 2019/0094629 A1    Mar. 28, 2019

(30) Foreign Application Priority Data
Sep. 22, 2017  (CN) .......................... 2017 1 0865496

(51) Int. Cl.
G02F 1/1337  (2006.01)
G02F 1/1335  (2006.01)
G02F 1/1343  (2006.01)
G02F 1/1341  (2006.01)

(52) U.S. Cl.
CPC ...... *G02F 1/133788* (2013.01); *G02F 1/1341* (2013.01); *G02F 1/13439* (2013.01); *G02F 1/133514* (2013.01); *G02F 1/133723* (2013.01)

(58) Field of Classification Search
None
See application file for complete search history.

(56) References Cited

U.S. PATENT DOCUMENTS 9,704,897 B1    7/2017  Fan et al.
2018/0157126 A1  6/2018  Chen

FOREIGN PATENT DOCUMENTS

CN    101872098 A    10/2010
CN    104977758 A    10/2015
CN    105629587 A    6/2016

*Primary Examiner* — Richard H Kim
(74) *Attorney, Agent, or Firm* — Mark M. Friedman

(57) ABSTRACT

A method for aligning liquid crystals is provided, and includes steps of providing a first substrate, forming a first electrode layer and a first alignment film on the first substrate; a second substrate, forming a second electrode layer and a second alignment film on the first substrate; forming a liquid crystal layer between the first alignment film and the second alignment film; providing an electrode plate and disposing the electrode plate on a side of the first substrate away from the first electrode layer; and applying a driving voltage between the electrode plate and the second electrode layer to align on the liquid crystal layer.

14 Claims, 5 Drawing Sheets

METHOD FOR ALIGNING LIQUID CRYSTALS AND LIQUID CRYSTAL ALIGNMENT SYSTEM

FIELD OF THE INVENTION

The present disclosure relates to the field of display technology, and more particularly to a method for aligning liquid crystals and a liquid crystal alignment system.

BACKGROUND OF THE DISCLOSURE

A liquid crystal display panel is typically composed of a color filter substrate (CF substrate), a thin film transistor array substrate (TFT array substrate), and a liquid crystal layer disposed between the two substrates. Working principle of the liquid crystal display panel is that a driving voltage is applied to the two glass substrates to control rotation of liquid crystal molecules of the liquid crystal layer, and light from a backlight module is refracted to show a picture.

According to different orientations of the liquid crystals, liquid crystal display panels may be divided into a vertical alignment (VA) type, a twisted nematic (TN) type, a super twisted nematic (STN) type, an in-plane switching (IPS) type, and a fringe field switching (FFS) type. In a liquid crystal alignment of a conventional liquid crystal display panel, a voltage is applied to indium tin oxide electrodes at both ends of a liquid crystal cell. After the liquid crystals are arranged in regular order, the liquid crystal cell is irradiated with UV light, and a photosensitive monomer in the liquid crystals is polymerized onto a polyimide (PI) surface for fixing orientation of the liquid crystal molecules on the PI surface. After the voltage is removed, the liquid crystal molecules on the PI surface form a pre-tilt angle to enhance response speed of the liquid crystal cell. When an optical alignment is performed in this manner, it is necessary to add a large number of wires onto the array substrate to provide the voltage to indium tin oxide on edges of the CF substrate, resulting in a decrease in utilization of the array substrate.

SUMMARY OF THE INVENTION

An object of the present disclosure is to provide a method for aligning liquid crystals and a liquid crystal alignment system for reducing the number of wires on a liquid crystal display panel.

A method for aligning liquid crystals is provided in an embodiment of the present disclosure, and includes steps of:

providing a first substrate formed with a first electrode layer thereon and a first alignment film covering the first electrode layer, wherein material of the first alignment film includes polyimide;

providing a second substrate disposed opposite to the second substrate, and formed with a second electrode layer thereon and a second alignment film covering the second electrode layer, wherein material of the second alignment film includes polyimide;

forming a liquid crystal layer between the first alignment film and the second alignment film;

providing an electrode plate and disposing the electrode plate on a side of the first substrate away from the first electrode layer;

applying a driving voltage between the electrode plate and the second electrode layer to align the liquid crystal layer; and removing the electrode plate from the first substrate.

In some embodiments, the liquid crystal layer includes a reaction monomer and liquid crystal molecules, and the step of applying the driving voltage between the electrode plate and the second electrode layer to align the liquid crystal layer includes steps of:

applying the driving voltage between the electrode plate and the second electrode layer, to arrange the reaction monomer and the liquid crystal molecules at a pre-tilt angle;

continuously applying the driving voltage, and irradiating the electrode plate with ultraviolet light, to generate a polymerization reaction of the reaction monomer, deposit the reaction monomer on a surface of the first alignment film and a surface of the second alignment film, and thus fix the liquid crystal molecules at the pre-tilt angle.

In some embodiments, the electrode plate includes a glass substrate and an electrode layer, and the step of applying the driving voltage between the electrode plate and the second electrode layer includes a step of:

applying the driving voltage between the electrode layer of the electrode plate and the second electrode layer.

In some embodiments, material of the electrode layer includes indium tin oxide.

In some embodiments, the first substrate is a color filter substrate.

In some embodiments, the second substrate is an array substrate.

A method for aligning liquid crystals is provided in an embodiment of the present disclosure, and includes steps of:

providing a first substrate formed with a first electrode layer thereon and a first alignment film covering the first electrode layer;

providing a second substrate disposed opposite to the second substrate, and formed with a second electrode layer thereon and a second alignment film covering the second electrode layer;

forming a liquid crystal layer between the first alignment film and the second alignment film;

providing an electrode plate and disposing the electrode plate on a side of the first substrate away from the first electrode layer; and applying a driving voltage between the electrode plate and the second electrode layer to align the liquid crystal layer.

In some embodiments, the liquid crystal layer includes a reaction monomer and liquid crystal molecules, and the step of applying the driving voltage between the electrode plate and the second electrode layer to align the liquid crystal layer includes steps of:

applying the driving voltage between the electrode plate and the second electrode layer, to arrange the reaction monomer and the liquid crystal molecules at a pre-tilt angle;

continuously applying the driving voltage, and irradiating the electrode plate with ultraviolet light, to generate a polymerization reaction of the reaction monomer, deposit the reaction monomer on a surface of the first alignment film and a surface of the second alignment film, and thus fix the liquid crystal molecules at the pre-tilt angle.

In some embodiments, the electrode plate includes a glass substrate and an electrode layer, and the step of applying the driving voltage between the electrode plate and the second electrode layer includes a step of:

applying the driving voltage between the electrode layer of the electrode plate and the second electrode layer.

In some embodiments, material of the electrode layer includes indium tin oxide.

In some embodiments, after the step of performing the alignment on the liquid crystal layer, the method further includes a step of:

removing the electrode plate from the first substrate.

In some embodiments, material of the first alignment film and material of the second alignment film include polyimide.

In some embodiments, the first substrate is a color filter substrate.

In some embodiments, the second substrate is an array substrate.

A liquid crystal alignment system is provided in an embodiment of the present disclosure, and includes a liquid crystal display panel; a power source; and an electrode plate being independent from the liquid crystal display panel;

wherein the liquid crystal display panel includes:

a first substrate including a first electrode layer and a first alignment film covering the first electrode layer;

a second substrate disposed opposite to the first substrate, and including a second electrode layer and a second alignment film covering the second electrode layer; and a liquid crystal layer disposed between the first alignment film and the second alignment film;

wherein the electrode plate is disposed on a side of the first substrate away from the first electrode layer;

wherein the power source is connected to the electrode plate and the second electrode layer, and the power source is configured to apply a driving voltage to the electrode plate and the second electrode layer to align the liquid crystal layer.

In some embodiments, the liquid crystal layer includes a reaction monomer and liquid crystal molecules, the liquid crystal alignment system further includes a light source, and wherein the light source is configured to irradiate the electrode plate with ultraviolet light, to generate a polymerization reaction of the reaction monomer, deposit the reaction monomer on a surface of the first alignment film and a surface of the second alignment film, and thus fix the liquid crystal molecules at the pre-tilt angle.

In some embodiments, the electrode plate includes a glass substrate and an electrode layer, the electrode layer is disposed between the glass substrate and the first electrode layer, and wherein the power source is connected to the electrode layer of the electrode plate and the second electrode layer, and is configured to apply the driving voltage to the electrode plate of the electrode plate and the second electrode layer.

In some embodiments, the liquid crystal alignment system further includes a removing device configured to remove the electrode plate from the first substrate.

In some embodiments, the first substrate is a color filter substrate.

In some embodiments, the second substrate is an array substrate.

Compared with a conventional method for aligning liquid crystals and a conventional liquid crystal alignment system, in the method for aligning the liquid crystals and the liquid crystal alignment system in the present disclosure, the number of wires on the liquid crystal display panel is reduced by disposing the electrode plate on the first substrate to perform the alignment on the liquid crystal layer.

To make the present disclosure clearly understood, the preferred embodiments are given hereinafter and are to be described in detail with reference to the accompanying drawings.

DETAILED DESCRIPTION OF THE PREFERRED EMBODIMENTS

Figure 1:
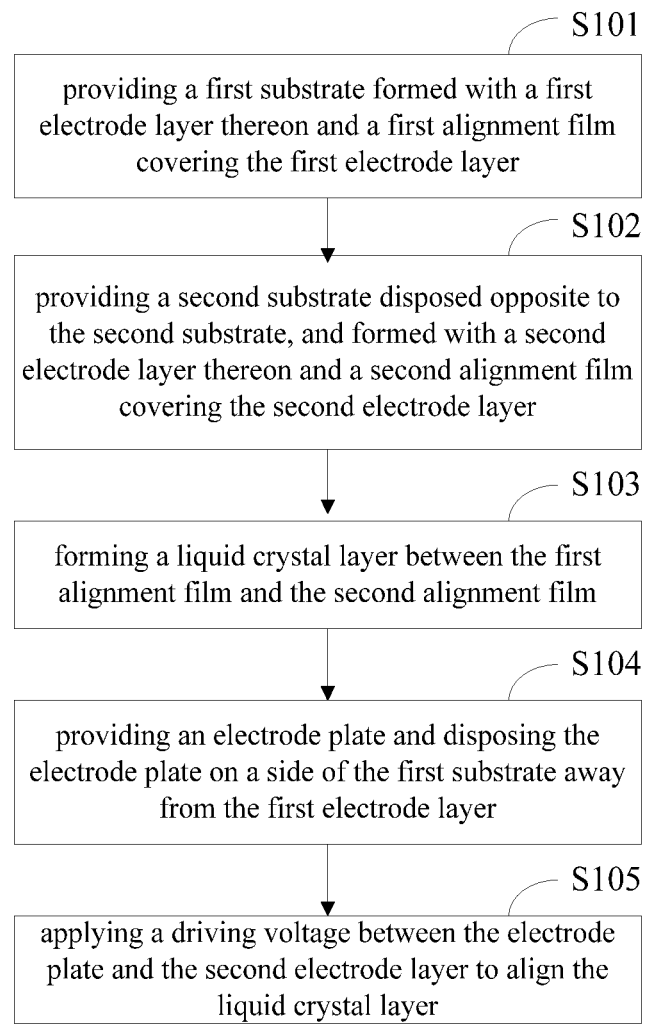
FIG. 1 is a flow chart of a method for aligning liquid crystals in accordance with an embodiment of the present disclosure.

The following description of the embodiments with reference to the accompanying drawings is used to illustrate particular embodiments of the present disclosure. The directional terms used in the present disclosure, such as "upper", "lower", "front", "back", "left", "right", "inner", "outer", "side surface", etc., are only directions with regard to the accompanying drawings. Therefore, the directional terms used for describing and illustrating the present disclosure are not intended to limit the present disclosure.

In the drawings, units with similar structures are indicated by the same reference number.

As to an "embodiment" mentioned herein, the particular features, structures, or characteristics described in this embodiment, which may be described in combination with the embodiment, may be included in at least one embodiment of the present disclosure. The phrases appearing at various locations in the specification do not necessarily refer to the same embodiments, nor to the embodiments being alternative to, mutually exclusive with, or independent from other embodiments. It is explicitly and implicitly understood by a person of ordinary skill in the art that the embodiments described herein may be combined with other embodiments.

Refer to FIG. 1, which is a flow chart of a method for aligning liquid crystals in accordance with an embodiment of the present disclosure. The method for aligning the liquid crystals includes the following steps.

In step S101, a first substrate formed with a first electrode layer thereon and a first alignment film covering the first electrode layer is provided.

In some embodiments, the first substrate is a color film substrate, and the first electrode layer is a common electrode layer. A polyimide solution is coated on the first electrode layer, and the polyimide solution is flattened and uniformly coated by its own surface tension. Then the first alignment film is obtained by high temperature condensation, that is, the material of the first alignment film includes polyimide.

In step S102, a second substrate disposed opposite to the second substrate, and formed with a second electrode layer thereon and a second alignment film covering the second electrode layer is provided.

In some embodiments, the second substrate is an array substrate, and the second electrode layer is a pixel electrode layer. A polyimide solution is coated on the second electrode layer, and the polyimide solution is flattened and uniformly coated by its own surface tension. Then the second alignment film is obtained by high temperature condensation, that is, the material of the second alignment film includes polyimide.

In step S103, a liquid crystal layer is formed between the first alignment film and the second alignment film.

Specifically, the liquid crystal molecules, in accompany with a reaction monomer, is injected between the first alignment film and the second alignment film to form the liquid crystal layer. That is, the liquid crystal layer includes the reaction monomer and the liquid crystal molecules.

In step S104, an electrode plate is provided and disposed on a side of the first substrate away from the first electrode layer The electrode plate includes a glass substrate and an electrode layer. In some embodiments, the electrode layer is a transparent conductive film. The material of the electrode layer includes indium tin oxide.

In step S105, a driving voltage is applied between the electrode plate and the second electrode layer to align the liquid crystal layer.

Figure 2:
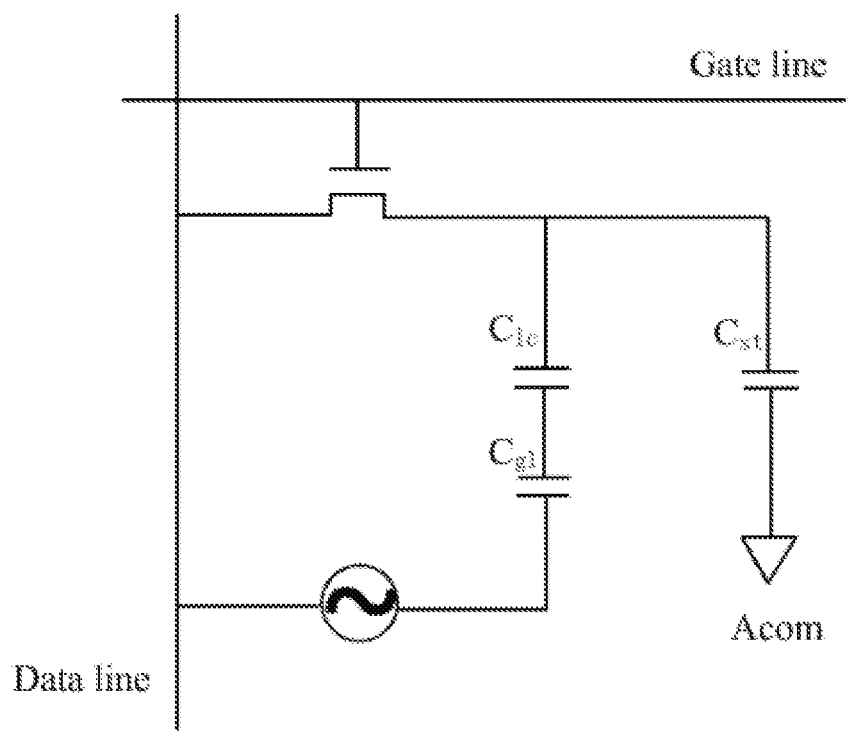
FIG. 2 is a schematic structural view of a circuit for a liquid crystal alignment in accordance with an embodiment of the present disclosure.

Refer to FIG. 2, which is a schematic structural view of a circuit for a liquid crystal alignment in accordance with the embodiment of the present disclosure. The circuit not only has a liquid crystal capacitance Clc and a storage capacitor Cst, but also has a coupling capacitance Cgl. Specifically, when a driving voltage is applied between the electrode plate and the second electrode layer, the coupling capacitance Cgl is formed between the electrode plate and the second electrode layer, i.e., the voltage across the liquid crystal layer is generated by the coupling capacitance Cgl. This eliminates the need to dispose a large number of wires on the second substrate to provide a voltage for the liquid crystal layer, and also improves utilization of the second substrate.

Figure 3:
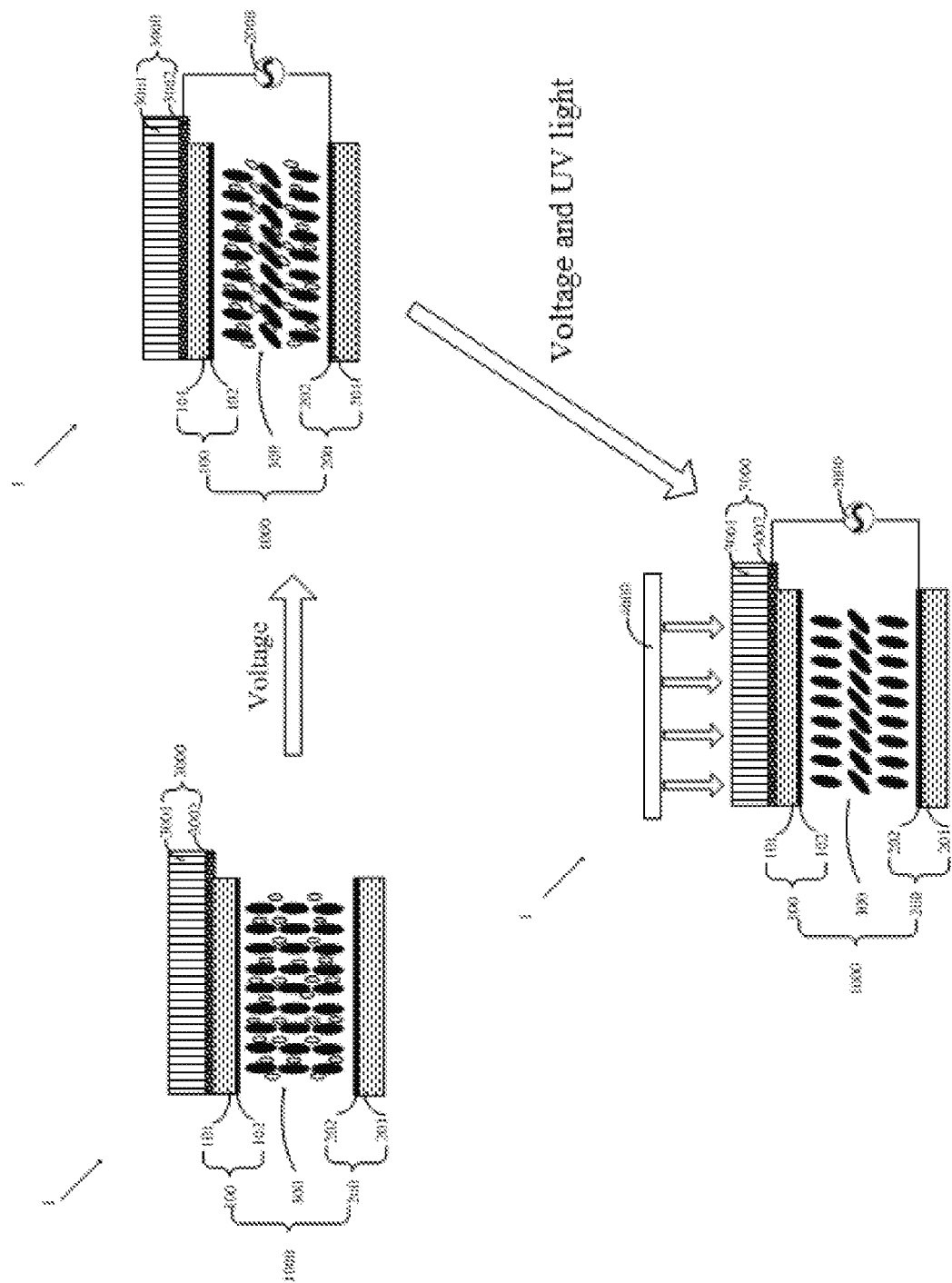
FIG. 3 is a schematic view of the method for aligning the liquid crystals in accordance with the embodiment of the present disclosure.

Specifically, as shown in FIG. 3, the driving voltage is applied between the electrode plate and the second electrode layer, so that the reaction monomer and the liquid crystal molecules are arranged at a pre-tilt angle. Afterwards, the driving voltage is continuously applied, and the electrode plate irradiated with ultraviolet (UV) light, to generate a polymerization reaction of the reaction monomer, deposit the reaction monomer on a surface of the first alignment film and a surface of the second alignment film, and thus fix the liquid crystal molecules at the pre-tilt angle.

In some embodiments, after the step of performing the alignment on the liquid crystal layer, the electrode plate is also removed from the first substrate. Increase in the thickness of the liquid crystal display panel, on whose liquid crystals the alignment is performed in the aforementioned method, is avoided.

Figure 4:
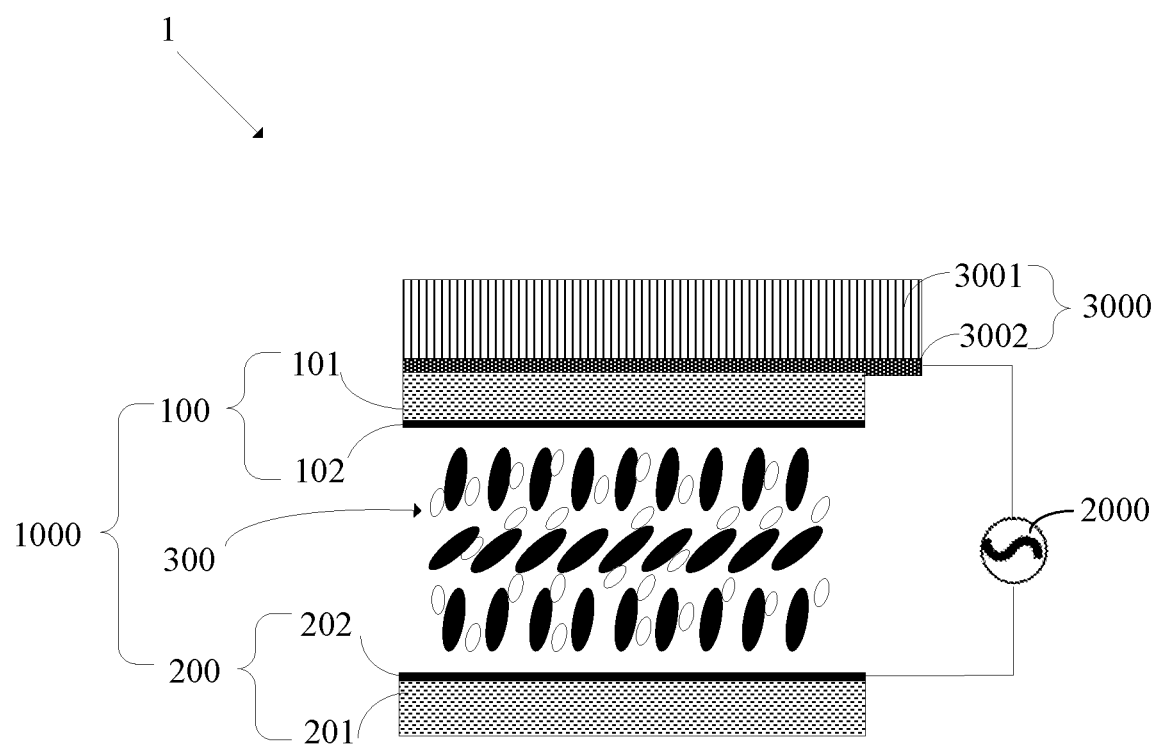
FIG. 4 is a schematic structural view of the liquid crystal alignment system in accordance with an embodiment of the present disclosure.

In the embodiment of the present disclosure, as shown in FIG. 4, a liquid crystal alignment system 1 is provided, and includes a liquid crystal display panel 1000, a power source 2000, and an electrode plate 3000 being independent from the liquid crystal display panel.

The liquid crystal display panel 1000 includes a first substrate 100, a second 200, and a liquid crystal layer 300. The first substrate 100 includes a first electrode layer 101 and a first alignment film 102 covering the first electrode layer 101. The second substrate 200 is disposed opposite to the first substrate 100, and includes a second electrode layer 201 and a second alignment film 202 covering the second electrode layer 201. The liquid crystal layer 300 is disposed between the first alignment film 102 and the second alignment film 202. In some embodiments, the material of the first alignment film 102 and the second alignment film 202 include polyimides.

The electrode plate 3000 is disposed on a side of the first substrate 100 away from the first electrode layer 101. In some embodiments, the electrode plate 3000 includes a glass substrate 3001 and an electrode layer 3002 disposed between the glass substrate 3001 and the first electrode layer 101. In some embodiments, the material of the electrode layer 402 includes indium tin oxide.

The power source 2000 is connected to the electrode plate 3000 and the second electrode layer 201. The power source 2000 is configured to apply a driving voltage to the electrode plate 3000 and the second electrode layer 201 to align the liquid crystal layer 300. Specifically, the power source 2000 is connected to the electrode layer 3002 of the electrode plate 3000 and the second electrode layer 201. The power source 2000 is configured to apply the driving voltage to the electrode layer 3002 of the electrode plate 3000 and the second electrode layer 201.

Figure 5:
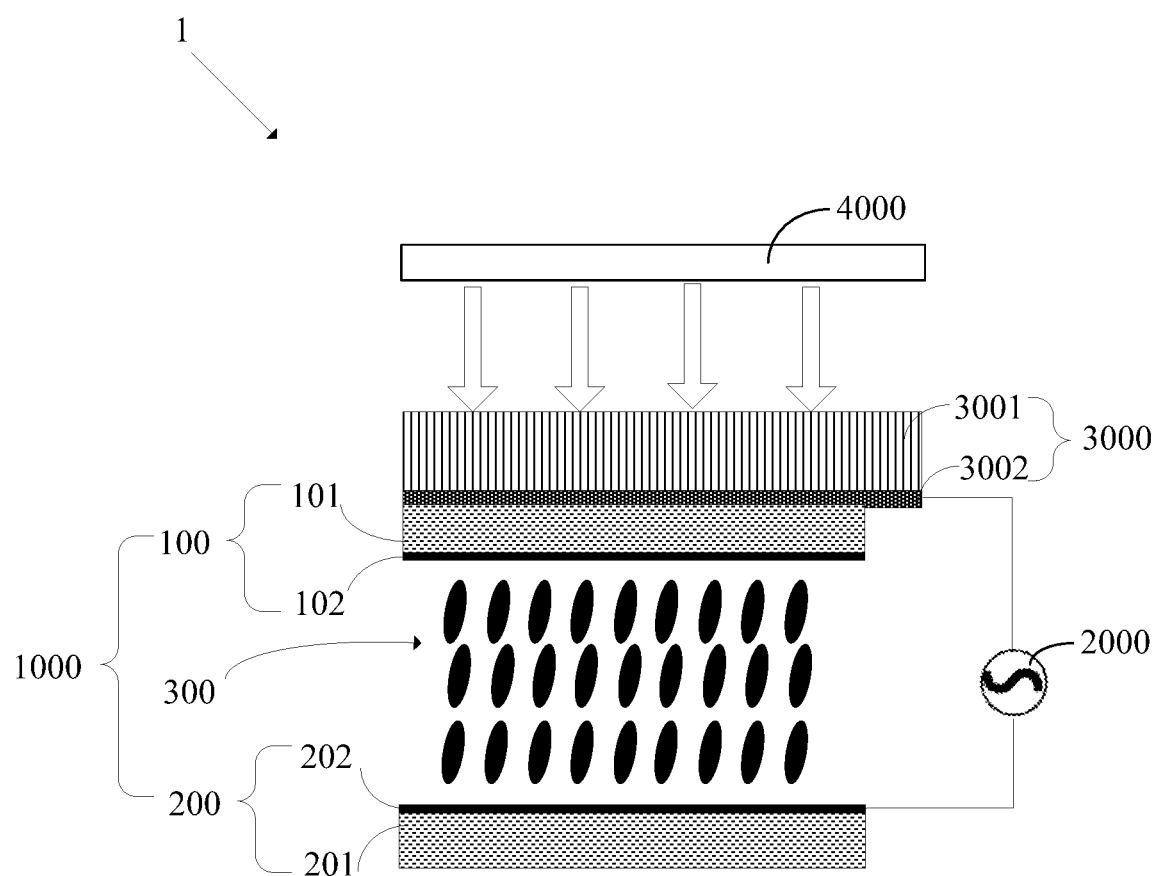
FIG. 5 is another schematic structural view of the liquid crystal alignment system in accordance with the embodiment of the present disclosure.

In some embodiments, the liquid crystal alignment system 1 further includes a light source 4000, as shown in FIG. 5. The light source 4000 is configured to irradiate the electrode plate 3000 with ultraviolet light, to generate a polymerization reaction of the reaction monomer in the liquid crystal layer 300, deposit the reaction monomer on a surface of the first alignment film 102 and a surface of the second alignment film 202, and thus fix the liquid crystal molecules at a pre-tilt angle in the liquid crystal layer 300.

In some embodiments, the liquid crystal alignment system 1 further includes a removing device, such as a clamp, for removing the electrode plate 3000 from the first substrate 100.

Specifically, as shown in FIG. 3, in the liquid crystal alignment system 1, the alignment process performed on the liquid crystal panel 1000 is as follows: the driving voltage is applied by the power source 2000 between the electrode plate 402 and the second electrode layer 201, so that the reaction monomer and the liquid crystal molecules in the liquid crystal layer 300 are arranged at the pre-tilt angle. Afterwards, the driving voltage is continuously applied by the power source 2000, and the electrode plate 400 irradiated with ultraviolet (UV) light by the light resource 4000, to generate a polymerization reaction of the reaction monomer, deposit the reaction monomer on a surface of the first alignment film 102 and a surface of the second alignment film 202, and thus fix the liquid crystal molecules at the pre-tilt angle.

The number of wires on the liquid crystal display panel is reduced by disposing the electrode plate on the first substrate to perform the alignment on the liquid crystal layer in the method for aligning the liquid crystals and the liquid crystal alignment system in the present disclosure.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is defined in the claims.

What is claimed is:

1. A method for aligning liquid crystals, comprising steps of:
providing a first substrate formed with a first electrode layer thereon and a first alignment film covering the first electrode layer, wherein material of the first alignment film includes polyimide;
providing a second substrate disposed opposite to the second substrate, and formed with a second electrode layer thereon and a second alignment film covering the second electrode layer, wherein material of the second alignment film includes polyimide;
forming a liquid crystal layer between the first alignment film and the second alignment film;

providing an electrode plate and disposing the electrode plate on a side of the first substrate away from the first electrode layer;

applying a driving voltage between the electrode plate and the second electrode layer to align the liquid crystal layer; and removing the electrode plate from the first substrate.

2. The method for aligning the liquid crystals as claimed in claim 1, wherein the liquid crystal layer includes a reaction monomer and liquid crystal molecules, and the step of applying the driving voltage between the electrode plate and the second electrode layer to align the liquid crystal layer includes steps of:

applying the driving voltage between the electrode plate and the second electrode layer, to arrange the reaction monomer and the liquid crystal molecules at a pre-tilt angle;

continuously applying the driving voltage, and irradiating the electrode plate with ultraviolet light, to generate a polymerization reaction of the reaction monomer, deposit the reaction monomer on a surface of the first alignment film and a surface of the second alignment film, and thus fix the liquid crystal molecules at the pre-tilt angle.

3. The method for aligning the liquid crystals as claimed in claim 1, wherein the electrode plate includes a glass substrate and an electrode layer, and the step of applying the driving voltage between the electrode plate and the second electrode layer includes a step of:

applying the driving voltage between the electrode layer of the electrode plate and the second electrode layer.

4. The method for aligning the liquid crystals as claimed in claim 3, wherein material of the electrode layer includes indium tin oxide.

5. The method for aligning the liquid crystals as claimed in claim 1, wherein the first substrate is a color filter substrate.

6. The method for aligning the liquid crystals as claimed in claim 1, wherein the second substrate is an array substrate.

7. A method for aligning liquid crystals, comprising steps of:

providing a first substrate formed with a first electrode layer thereon and a first alignment film covering the first electrode layer;

providing a second substrate disposed opposite to the second substrate, and formed with a second electrode layer thereon and a second alignment film covering the second electrode layer;

forming a liquid crystal layer between the first alignment film and the second alignment film;

providing an electrode plate and disposing the electrode plate on a side of the first substrate away from the first electrode layer; and applying a driving voltage between the electrode plate and the second electrode layer to align the liquid crystal layer.

8. The method for aligning the liquid crystals as claimed in claim 7, wherein the liquid crystal layer includes a reaction monomer and liquid crystal molecules, and the step of applying the driving voltage between the electrode plate and the second electrode layer to align the liquid crystal layer includes steps of:

applying the driving voltage between the electrode plate and the second electrode layer, to arrange the reaction monomer and the liquid crystal molecules at a pre-tilt angle;

continuously applying the driving voltage, and irradiating the electrode plate with ultraviolet light, to generate a polymerization reaction of the reaction monomer, deposit the reaction monomer on a surface of the first alignment film and a surface of the second alignment film, and thus fix the liquid crystal molecules at the pre-tilt angle.

9. The method for aligning the liquid crystals as claimed in claim 7, wherein the electrode plate includes a glass substrate and an electrode layer, and the step of applying the driving voltage between the electrode plate and the second electrode layer includes a step of:

applying the driving voltage between the electrode layer of the electrode plate and the second electrode layer.

10. The method for aligning the liquid crystals as claimed in claim 9, wherein material of the electrode layer includes indium tin oxide.

11. The method for aligning the liquid crystals as claimed in claim 7, after the step of performing the alignment on the liquid crystal layer, further comprising a step of:

removing the electrode plate from the first substrate.

12. The method for aligning the liquid crystals as claimed in claim 7, wherein material of the first alignment film and material of the second alignment film include polyimide.

13. The method for aligning the liquid crystals as claimed in claim 7, wherein the first substrate is a color filter substrate.

14. The method for aligning the liquid crystals as claimed in claim 7, wherein the second substrate is an array substrate.

* * * * *